United States Patent [19]

Hansch et al.

[11] 4,451,923

[45] May 29, 1984

[54] METHOD OF AND APPARATUS FOR MEASURING OPTICAL FREQUENCY VARIATIONS

[76] Inventors: Theodor W. Hansch, 15100 Oak Creek Dr., (Apt. 405), Palo Alto, Calif. 94304; Bernard J. Couillaud, 26 rue Ernest Renaut, Talence, France

[21] Appl. No.: 211,910

[22] Filed: Dec. 1, 1980

[51] Int. Cl.$^3$ ................................................. H01S 3/13
[52] U.S. Cl. ....................................... 372/32; 372/27; 372/29; 350/394; 350/393; 350/385
[58] Field of Search ........................... 372/27, 29, 32; 350/385, 393, 394

[56] References Cited

U.S. PATENT DOCUMENTS 3,594,659  7/1971  Brandli ................................. 372/32

OTHER PUBLICATIONS

"Frequency Stabilization of Gas Lasers", by White, *IEEE Jour. Quant. Elect.*, vol. QE-1, No. 8, Nov. 1965.

*Primary Examiner*—William L. Sikes
*Assistant Examiner*—Leon Scott, Jr.
*Attorney, Agent, or Firm*—Paul B. Fihe

[57] ABSTRACT

Herein is disclosed a method of and apparatus for measuring optical frequency variations wherein linearly-polarized incident light generated by a tunable laser or the like is delivered to a passive resonant cavity incorporating a linear polarizer such as a Brewster plate so that the reflected light acquires a frequency-dependent elliptical polarization which can be detected by a simple polarization analyzer providing a signal correlated with the frequency variation of the laser. Such signal can be utilized as a feedback error signal to stabilize the laser frequency, or to adjust the cavity resonance. If the cavity is tunable, tuning thereof will in turn provide a precision method for tuning of the laser itself.

5 Claims, 4 Drawing Figures

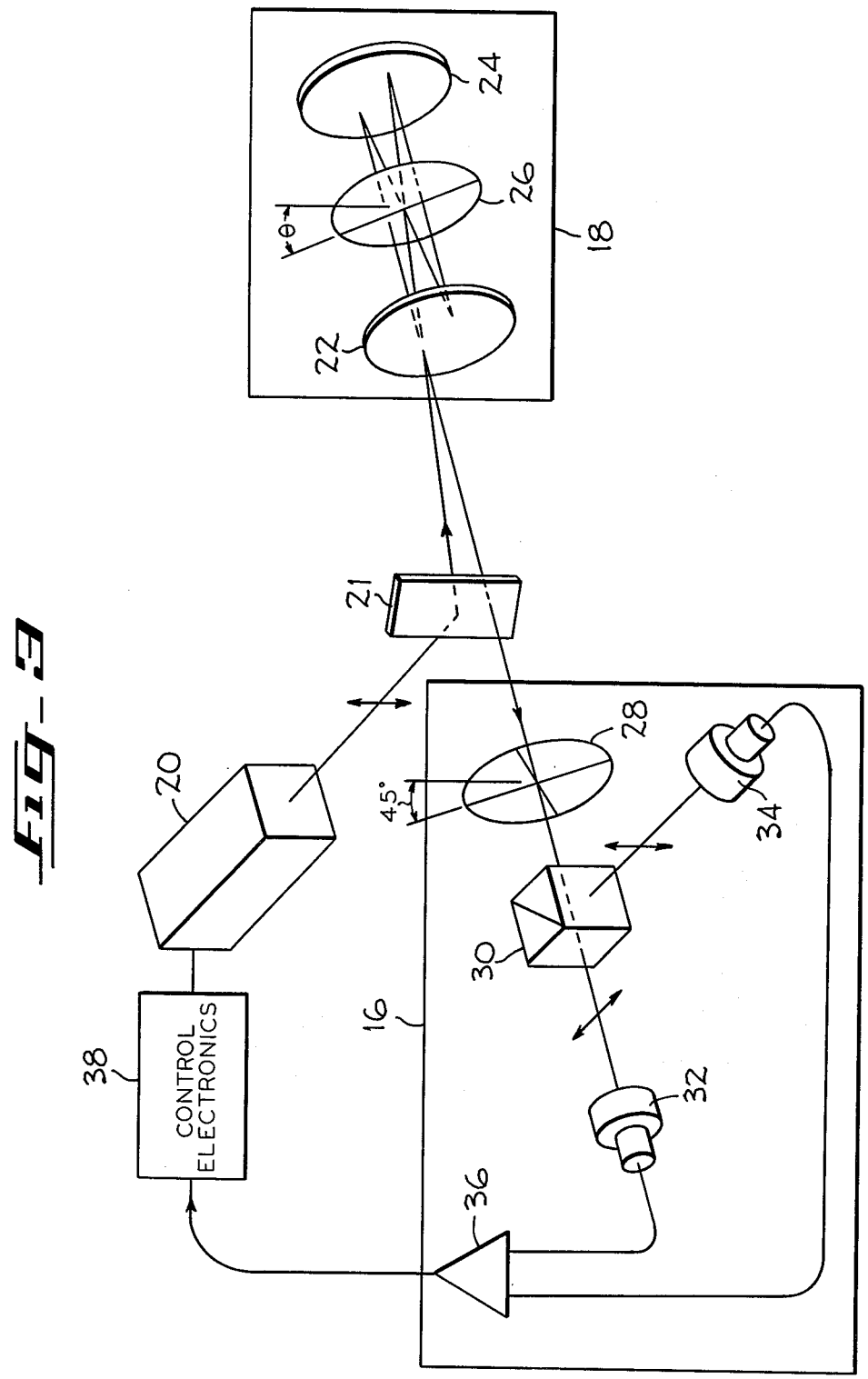

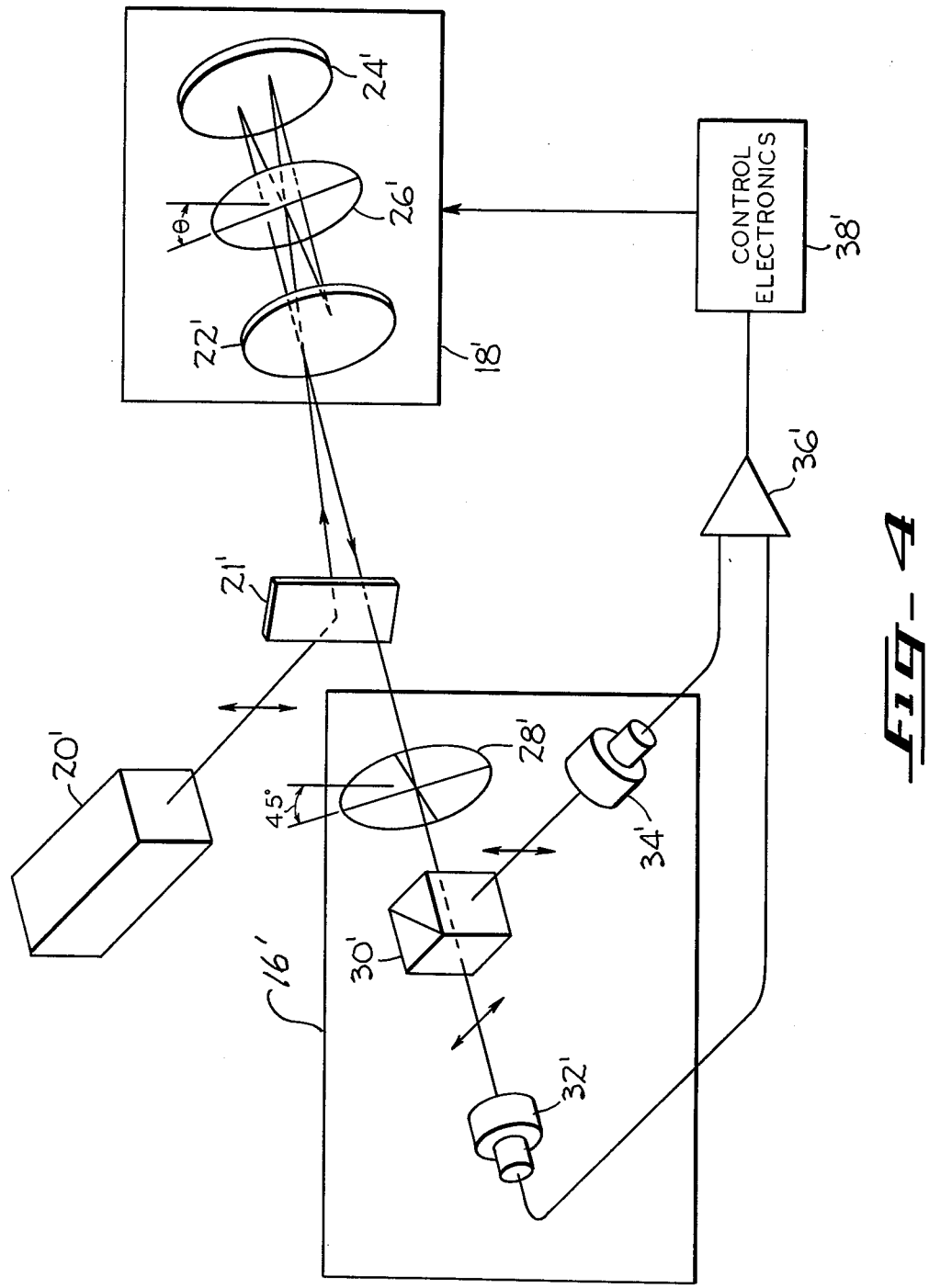

METHOD OF AND APPARATUS FOR MEASURING OPTICAL FREQUENCY VARIATIONS

FIELD OF THE INVENTION

The present invention relates generally to the measurement of frequency and more particularly to a method of and apparatus for measuring optical frequency variations for various purposes, such as stabilization of the output frequency of a laser.

BACKGROUND OF THE INVENTION

It is, of course, well known that the optical frequency output of a laser varies as a result of various perturbations. Such variations commonly exceed $10^{-5}$ percent and actual frequency jumps of greater amounts are also experienced. Such variations interfere with the precision necessary for a large number of applications, and, as a consequence, attempts have been made to stabilize the generated optical frequency by electrically locking the laser output frequency to some reference passive optical cavity. If light is transmitted through such a cavity, the transmitted intensity versus the frequency is known to exhibit the familiar periodic resonant maxima or fringes described by the Airy function. For example, such characteristic has been utilized by Borger, Sorem and Hall as specifically described in Appl. Physics Letters 22, pg. 573 (1973) to servo-lock the laser frequency to the side of one fringe, using a fast differencing technique. However, an accidental frequency jump of no more than half a fringe can throw the system out of lock. A reference cavity of low finesse alleviates this immediate problem but generates another, the laser frequency becoming extremely sensitive to small changes in cavity finesse or drifts in the associated photodetectors or amplifiers.

Rather than the utilization of the side of one fringe of the Airy function, its derivative has been utilized by White as described in IEEE Journal, Quantron Electronics, QE-1, pg. 349 (1965) so that locking to the fringe center is enabled. In this case, the frequency of the laser or reference cavity is modulated and the resultant amplitude modulation monitored with a phase sensitive detector whose output signal is the desired derivative of the Airy function. Obviously, more elaborate electronics are required and the output signal drops quickly to zero off resonance so that recovery from large frequency jumps is difficult if not impossible.

These, as well as other systems, utilize the transmitted light even though the resultant signal-to-noise ratio is poorer than that of a cavity-reflected signal.

SUMMARY OF THE PRESENT INVENTION

Accordingly, it is the general objective of the present invention to provide a method of and apparatus for measuring optical frequency variations through detection of frequency-dependent polarization of reflected light, enabling, for example, stabilization of the frequency of a laser, adjustment of an optical cavity, laser tuning or various other applications.

To achieve such objective, a resonant passive optical cavity is positioned to receive a beam of linearly-polarized light at an off-axis position so that the electric field perpendicular component of the light is directly reflected at the entrance of the cavity, thus to provide a reference.

On the other hand, the parallel electric field component enters the optical cavity so as to pass through a linear polarizer within the cavity, which polarizer is disposed so that its transmission axis forms an angle $\theta$ with the polarization axis of the incident light beam. After reflection in the cavity, the parallel component is then indirectly reflected along the same path as the directly reflected perpendicular component. Such parallel component experiences a frequency-dependent phase shift relative to the perpendicular component and any phase change, resultant from a frequency deviation, will make the resulting reflected beam elliptically polarized.

Any such phase change is detected by a polarization analyzer whose output therefore indicates the amount of frequency deviation.

Such output can be utilized merely to indicate any frequency change or can be applied in a feedback loop to control the frequency of the light source, such as a laser, or for adjustment of the passive cavity resonance and for a variety of applications where the frequency monitoring or stabilization would be useful.

BRIEF DESCRIPTION OF THE DRAWINGS

The stated objective of the invention and the manner in which it is achieved, as summarized above, will be more readily understood by reference to the following detailed description of the exemplary arrangements shown in the accompanying drawings wherein:

FIG. 3 is a diagrammatic view of the invention as applied to frequency stabilization of a laser, and FIG. 4 is a diagrammatic view, similar to FIG. 3, for control of a cavity resonator.

DETAILED DESCRIPTION OF THE EXEMPLARY EMBODIMENTS OF THE INVENTION

Figure 1:
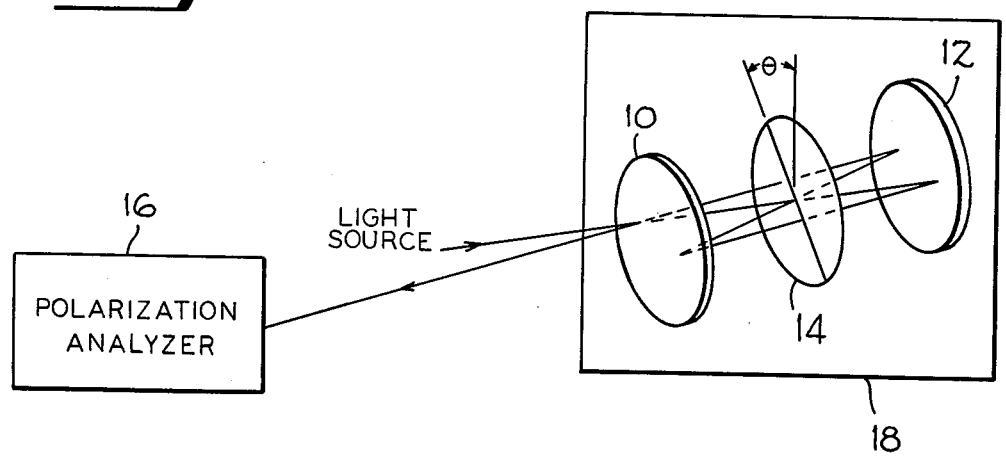
FIG. 1 is a general diagrammatic view indicating the technique of measuring frequency variations in accordance with the present invention.

With initial reference to FIG. 1, a polarization cavity 18 is positioned to receive a beam of linearly-polarized light. More particularly, the cavity 18 takes the form of a confocal resonant passive optical cavity including two mirrors 10 ans 12 positioned to receive the beam from the light source at an off-axis position, thus to provide a small angle between the incident and reflected beam. Between the mirrors 10 and 12, the polarization cavity 18 includes a linear polarizer 14 in the form of an anisotropic optical element such as glass, disposed at Brewster's angle so that its transmission axis forms an angle $\theta$ relative to the polarization axis of the incident light beam.

The incoming light can be decomposed into two orthogonal linearly-polarized components with their electric field vectors parallel and perpendicular to the transmission axis of the intracavity polarizer. Their field amplitudes in the plane wave approximation are $$E^{(i)}_{\parallel} = E^{(i)} \cdot \cos\theta, \tag{1}$$

$$E^{(i)}_{\perp} = E^{(i)} \cdot \sin\theta, \tag{2}$$

where $E^{(i)}$ is the amplitude of the incident beam.

The perpendicular component, $E^{(i)}_\perp$, is simply and directly reflected by the entrance mirror 10 and can be represented to a first approximation as $$E_\perp^{(r)} = E_\perp^{(i)} \sqrt{R_1} \qquad (3)$$

where $R_1$ is the reflectivity of the mirror 10.

On the other hand, the parallel component $E^{(i)}_\parallel$ enters the cavity 18 and makes several reflected transits between the two mirrors 10, 12 before being indirectly reflected along the same path as the directly reflected perpendicular component. In such transits, the parallel component passes through the linear polarizer 14 and accordingly experiences a frequency-dependent phase shift. In accordance with standard theory, for example as delineated in "Principles of Optics", Born and Wolf, Pergamon Press, Oxford 1970 (Chapter 7.6), the complex amplitude of the reflected parallel component can easily be calculated as $$E_\parallel^{(r)} = E_\parallel^{(i)} \left( \sqrt{R_1} - \frac{T_1 R}{\sqrt{R_1}} \cdot \frac{\cos\delta - R + i\sin\delta}{(1-R)^2 + 4R\sin^2\frac{\delta}{2}} \right) \qquad (4)$$

where $R_1$ and $T_1$ are the reflectivity and transmissivity of the cavity entrance mirror 10, $\delta$ is the frequency, and $R<1$ gives the amplitude ratio between successive roundtrips, which determines the cavity finesse $f = \pi\sqrt{R}/(1-R)$. The ratio R accounts for any attenuation by the internal polarizer and for other losses, including the two extra reflections which are required for one roundtrip in a confocal resonator used off-axis.

At exact resonance, ($\delta = 2m\pi$), both reflection coefficients are real and the reflected wave components remain in phase. The reflected beam remains linearly polarized, even though its polarization axis will be rotated from the original direction. Away from resonance, however, the parallel component acquires a phase shift relative to the perpendicular component, owing to the imaginary part of $E^{(r)}_\parallel$, and the reflected beam acquires an elliptical polarization correlated with the amount of frequency deviation from resonance. The handedness of the polarization ellipse depends on the sign of the detuning from resonance.

The amount of ellipticity and, as a consequence, the frequency change can be determined by separating the reflected perpendicular and parallel components into counterrotating circularly polarized waves, then detecting their individual intensities, $I_a$ and $I_b$, and providing an output signal, $I_a - I_b$, correlated with the amount of frequency variation.

Figure 2:
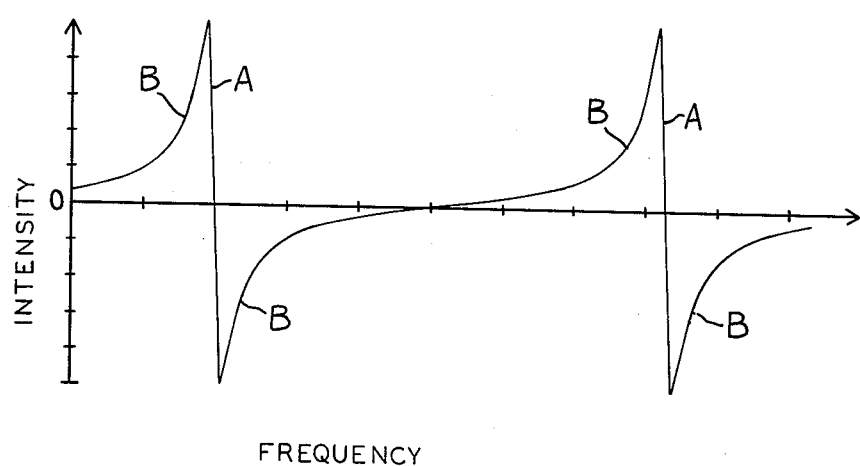
FIG. 2 is a graphical representation of current intensity versus frequency variation in the operation of the invention.

The differential intensity $I_a - I_b$ can be plotted against the frequency as shown in FIG. 2 by the equation $$I_a - I_b = I^{(i)} \cdot 2\cos\theta \sin\theta \frac{T_1 \cdot R \cdot \sin\delta}{(1-R)^2 + 4R\sin^2\frac{\delta}{2}}$$

where $I^{(i)}$ is the intensity of the incident light beam. This function, $I_a - I_b$, as shown in FIG. 2, combines a steep resonant slope A with far reaching wings B and provides an ideal error signal for servo locking of a laser frequency or other purposes.

The steep resonant slope A insures precision for slight frequency variations will produce relatively large changes in the ellipticity of the reflected beam. Furthermore, such measured changes exist from the center of the cavity resonance so that such cavity resonance is well defined regardless of its finesse.

Additionally, the wide wings B provide a signal at large frequency changes enabling measurement even after large frequency jumps.

A specific form of polarization analyzer 16 and a specific application of the inventive concept to frequency stabilization of a laser can be explained by detailed reference to FIG. 3. As therein shown, linearly-polarized light from a tunable single mode laser 20 is reflected by an angularly-disposed mirror 21 to enter a polarization cavity generally indicated by the numeral 18 so as to correspond to the general arrangement of FIG. 1. The beam enters the cavity 18 consisting of two confocal mirrors 22, 24 at an off-axis position so that a small angle exists between the incident and reflected light beams, thus to avoid direct light feedback into the laser 20.

As explained in connection with the description of FIG. 1, the perpendicular light component is directly reflected by the entrance mirror 22 whereas the parallel component enters the cavity polarizer for reflected transits between the two mirrors 22, 24 so as to traverse a linear polarizer 26 within the cavity before being indirectly reflected along the same path as the directly-reflected perpendicular component.

The two reflected components which are phase shifted a frequency-dependent amount, as explained hereinabove, are delivered to the polarization analyzer 16. In FIG. 3, such analyzer includes a quarter-wavelength retarder 28 in the form of a glass Fresnel rhomb whose fast axis is rotated by forty-five degrees relative to the polarization axis of an adjacent beam-splitter 30 which can constitute a standard calcite polarization beam-splitter.

Elliptically-polarized light can, of course, be considered as a superposition of two counterrotating circularly polarized components of different amplitudes. The quarter-wavelength retarder 28 transforms these circular components into orthogonal linearly-polarized waves, which are separated by the beam-splitter 30 so that their intensities can be measured individually. If the incoming light is linearly-polarized, the two circular components have equal intensities.

The two outputs from the beam-splitter 30 are directed to separate photodetectors 32, 34, which are both connected to a differential amplifier 36 whose output constitutes the previously discussed output signal $I_a - I_b$.

In FIG. 3, such output signal, $I_a - I_b$, constitutes an "error signal" which is delivered to the control electronics indicated at 38 in a feedback loop to control and stabilize the frequency of the laser 20, connected thereto in a conventional fashion.

Experiments have shown that frequency stabilization of less than $10^{-7}$ percent can be achieved. Such stabilization enables the very advantageous utilization of the inventive principle in precision interferometers, laser gyroscopes, spectral filters and many other applications which will occur to those skilled in the art.

It will also be obvious to those skilled in the art that passive optical cavities other than the confocal cavity described can be utilized, such as semi-confocal cavities, ring cavities or Fabry-Perot interferometers.

Since, as will be apparent from the foregoing description of FIG. 3, a laser can be servo locked to a passive cavity, if the cavity resonance is changed by known techniques of varying the cavity length or the refractive index of its elements, one can provide an obvious method of tuning of the tunable laser 20 by the simple additional step of tuning the described polarization cavity 18.

Additionally, rather than utilizing feedback to stabilize the laser frequency, the developed error signal can be used to lock a passive optical cavity to the frequency of a laser. Such alternate arrangement is shown in FIG. 4, and since corresponding elements can be utilized, they are indicated by corresponding reference numerals with an added prime notation.

Briefly then, as shown in FIG. 4, light from a laser 20' is reflected by a mirror 21' to enter a polarization cavity 18' including confocal mirrors 22', 24' and an intracavity linear polarizer 26'. The directly and indirectly reflected light is delivered to a polarization analyzer 16' including a retarder 28', beam splitter 30', detectors 32', 34', and a differential amplifier 36' to develop a frequency-dependent error signal. Such error signal, in this embodiment of the invention, is delivered to control electronics 38' which is arranged to vary resonance of the cavity 18' so that it can, in turn, be locked to the frequency of the laser 20'. Various known techniques can be employed to adjust the optical cavity, such as utilization of piezoelectric materials, and thus are not discussed in further detail.

It will be apparent to those skilled in the art that many modifications and/or alterations other than those specifically mentioned can be made without departing from the spirit of the invention, and, as a consequence, the foregoing description of several embodiments is not to be considered in a limiting sense and the actual scope of the invention is to be determined only by reference to the appended claims.

What is claimed is:

1. The method of frequency stabilizing a tunable laser which comprises the steps of positioning a resonant passive optical cavity to receive a laser beam so that a perpendicular component is directly reflected but a parallel component enters the cavity for indirect reflection therefrom, disposing an intracavity anisotropic optical element in said cavity at an angle relative to a polarization axis of the incident laser beam to produce a phase shift of an indirectly reflected parallel component relative to a directly reflected perpendicular component, thus to provide a frequency-dependent phase shift between said two reflected components, resulting in an elliptical polarization correlated with any frequency deviation from cavity resonance, detecting the amount of ellipticity to provide an error signal, and adjusting the laser frequency an amount determined by the amplitude of such error signal.

2. The method of frequency stabilizing a tunable laser according to claim 1 which comprises the additional step of transforming said reflected components into two counterrotating circularly polarized waves for the subsequent detection.

3. The method of adjusting the resonance of a passive optical cavity which comprises the steps of directing light from a linearly-polarized laser source into an optical cavity so that a perpendicular component is directly reflected but a parallel component enters said cavity for indirect reflection therefrom, disposing an intracavity anisotropic optical element in said cavity at an angle relative to a polarization axis of the incident laser beam to produce a phase shift of said indirectly reflected parallel component relative to said directly reflected perpendicular component, thus to provide a frequency-dependent phase shift between said two reflected components, resulting in an elliptical polarization correlated with any frequency deviation from cavity resonance, detecting the amount of ellipticity to provide an error signal, and adjusting the cavity resonance an amount determined by the amplitude of such error signal.

4. Apparatus for stabilizing a tunable laser which comprises a polarization cavity arranged to receive a laser beam so that a perpendicular component is directly reflected but a parallel component enters said cavity for indirect reflection therefrom, a polarization detector positioned to receive the light reflected from said polarization cavity so as to decompose the reflected light into two counterrotating circularly polarized components and provide an output signal constituting the difference of the detected components, and means for adjusting the frequency of said laser in accord with the output signal.

5. Apparatus for adjusting the resonant frequency of a tunable optical cavity which comprises a laser positioned to direct a laser beam into an optical cavity so that a perpendicular component is directly reflected but a parallel component enters said cavity for indirect reflection therefrom, an anisotropic element disposed in said cavity at an angle relative to a polarization axis of said incident laser beam to produce a phase shift of the indirectly reflected parallel component relative to the directly reflected perpendicular component, thus to provide a frequency-dependent phase shift between the two reflected components, resulting in an elliptical polarization correlated with any frequency deviation from cavity resonance, a polarization detector positioned to receive the light reflected from said polarization cavity so as to decompose the reflected light into two counterrotating circularly polarized components and provide an output signal constituting the difference of the detected components, and means for changing the resonance of said cavity an amount determined by the output signal.

* * * * *